(12) United States Patent
Betts et al.

(10) Patent No.: US 9,403,591 B2
(45) Date of Patent: Aug. 2, 2016

(54) LANDING GEAR CONTROL SYSTEM

(71) Applicant: Mason Electric Co., Sylmar, CA (US)

(72) Inventors: Byron Betts, Acton, CA (US); John Ronquillo, Los Angeles, CA (US)

(73) Assignee: Mason Electric Co., Sylmar, CA (US)

( * ) Notice: Subject to any disclaimer, the term of this patent is extended or adjusted under 35 U.S.C. 154(b) by 69 days.

(21) Appl. No.: 13/948,939

(22) Filed: Jul. 23, 2013

(65) Prior Publication Data

US 2015/0027266 A1    Jan. 29, 2015

(51) Int. Cl.
*G05G 1/04* (2006.01)
*B64C 25/18* (2006.01)

(52) U.S. Cl.
CPC ........... *B64C 25/18* (2013.01); *Y10T 29/49826* (2015.01); *Y10T 74/20618* (2015.01)

(58) Field of Classification Search
USPC ........ 74/473.3, 491, 503, 519, 524; 244/99.2, 244/102 R, 221, 224, 232
See application file for complete search history.

(56) References Cited

U.S. PATENT DOCUMENTS

| | | | | |
|---|---|---|---|---|
| 2,928,629 | A | * | 3/1960 | Soderberg ................. 244/102 R |
| 5,195,381 | A | * | 3/1993 | Keibler ....................... 73/862.05 |
| 5,288,037 | A | * | 2/1994 | Derrien ................... 244/102 SL |
| 5,409,185 | A | * | 4/1995 | Oldakowski ................. 244/75.1 |
| 5,984,241 | A | * | 11/1999 | Sparks .......................... 244/224 |
| 7,316,373 | B2 | * | 1/2008 | Nagayama et al. ........... 244/224 |
| 2013/0247625 | A1 | * | 9/2013 | Geng ................. E05B 47/0038 70/276 |

\* cited by examiner

*Primary Examiner* — Vicky Johnson
(74) *Attorney, Agent, or Firm* — Perkins Coie LLP

(57) ABSTRACT

A landing gear control lever system including a lever assembly, a locking assembly, and a switch assembly is disclosed herein. The locking assembly is connected to the lever assembly. The locking assembly has a rotary actuator and a Scotch yoke member operably connected to a portion of the rotary actuator such that rotation of the rotary actuator causes linear movement of the Scotch yoke member. The locking assembly can further include a locking arm operably coupled to the Scotch yoke member and moveable between locked and unlocked positions upon rotation of the rotary actuator.

17 Claims, 9 Drawing Sheets

MANUAL UNLOCKED

LANDING GEAR CONTROL SYSTEM

TECHNICAL FIELD

Embodiments of the present invention are directed to landing gear control assemblies, and, more particularly to a landing gear control locking assembly.

BACKGROUND

Conventional aircraft with retractable landing gear typically include landing gear controls on the cockpit control panel that include a lever for manual control of the raising and lowering of the landing gear. Landing gear controls also typically include a locking device to prevent inadvertent raising of the control lever (which would raise the landing gear) as long as the lowered landing gear bears the weight of the aircraft. To control actuation of the locking device, conventional aircraft landing gear controls use linear solenoids that tend to be bulky and require a relatively large spatial envelope in the control area. These linear solenoids also use a large amount of power, which creates a considerable amount of heat that is hard to dissipate in the closed environment of an aircraft cockpit. Accordingly, there is a need for a reliable, low-power landing gear control system for use in an aircraft while remaining in a compact spatial envelope.

SUMMARY

The present invention provides a landing gear control ("LGC") system that overcomes drawbacks in the prior art and provide additional benefits. A brief summary of some embodiments and aspects of the invention are presented. Thereafter, a detailed description of the illustrated embodiments is presented, which will permit one skilled in the relevant art to understand, make, and use the invention. One skilled in the art can obtain a full appreciation of aspects of the invention from the subsequent detailed description, read together with the figures, and from the claims, which follow the detailed description.

In accordance with at least one embodiment of the invention, a landing gear control system for use in an aircraft includes a lever assembly having a control lever pivotable between a first position and a second position about a pivot point; a locking element coupled to the control lever, a switch assembly operably connected to the lever assembly and configured to control movement of landing gear of the aircraft; and a locking assembly operably connected to the lever assembly. In some embodiments, the locking assembly can have a rotary actuator, a Scotch yoke member operably connected to a portion of the rotary actuator such that rotation of the rotary actuator causes linear movement of the Scotch yoke member, and a locking arm operably coupled to the Scotch yoke member and moveable between locked and unlocked positions upon rotation of the rotary actuator. When the locking arm is in the locked position, the locking arm engages the locking element of the lever assembly when the control lever is in the first position, and also prevents the control lever from moving to the second position. When the locking arm is in the unlocked position, the control lever can move away from the first position.

In one embodiment, the LGC system includes a manual override member coupled to the locking arm and manually actuatable to move the locking arm from the locked position to the released position independent of rotation of the rotary actuator to allow manual movement of the control lever between the first and second positions. In some embodiments, the rotary actuator of the locking assembly comprises a rotary solenoid.

Another embodiment further provides a switch actuator rotatably connected to the control lever, wherein the switch actuator has an extendable portion that is configured to extend and retract upon rotation of the control lever. In some of these embodiments, the switch actuator includes a hollow, tubular housing and the extendable portion is a spring-loaded plunger at least partially contained within the housing. In these and other embodiments, the LGC system may further include a cam plate mechanically coupled to the switch actuator, and the extendable member of the switch actuator slides along a surface of the cam plate during rotation of the control lever.

In some embodiments, the locking assembly further includes a drive pin coupled to the rotary actuator and the Scotch yoke member further includes a shaft coupled to the locking arm and a slot portion extending laterally from the shaft. The slot portion of the Scotch yoke member slidably engages the drive pin, and in some embodiments the locking arm includes a groove portion configured to contain the locking element of the lever assembly when the locking arm is in the locked position. In these and other embodiments, the locking assembly further includes a clevis operably coupled to the Scotch yoke member, the manual override button, and the locking arm.

Another embodiment further provides a method of pivotally attaching a lever assembly to a chassis. The lever assembly has a control lever pivotable between a first position and a second position about a pivot point, and a locking element coupled to the control lever. The method includes connecting the lever assembly to the chassis and coupling the lever assembly to a switch assembly. The switch assembly is configured to control movement of landing gear of an aircraft. The method includes connecting a locking assembly to the chassis. The locking assembly includes: a rotary actuator; a Scotch yoke member operably connected to a portion of the rotary actuator such that rotation of the rotary actuator causes linear movement of the Scotch yoke member. A locking arm is operably coupled to the Scotch yoke member and moveable between locked and unlocked positions upon rotation of the rotary actuator. The locking arm in the locked position engages the locking element of the lever assembly when the control lever is in the first position and prevents the control lever from moving to the second position. The locking arm in the unlocked position allows the control lever to move away from the first position.

DETAILED DESCRIPTION

Figure 1:
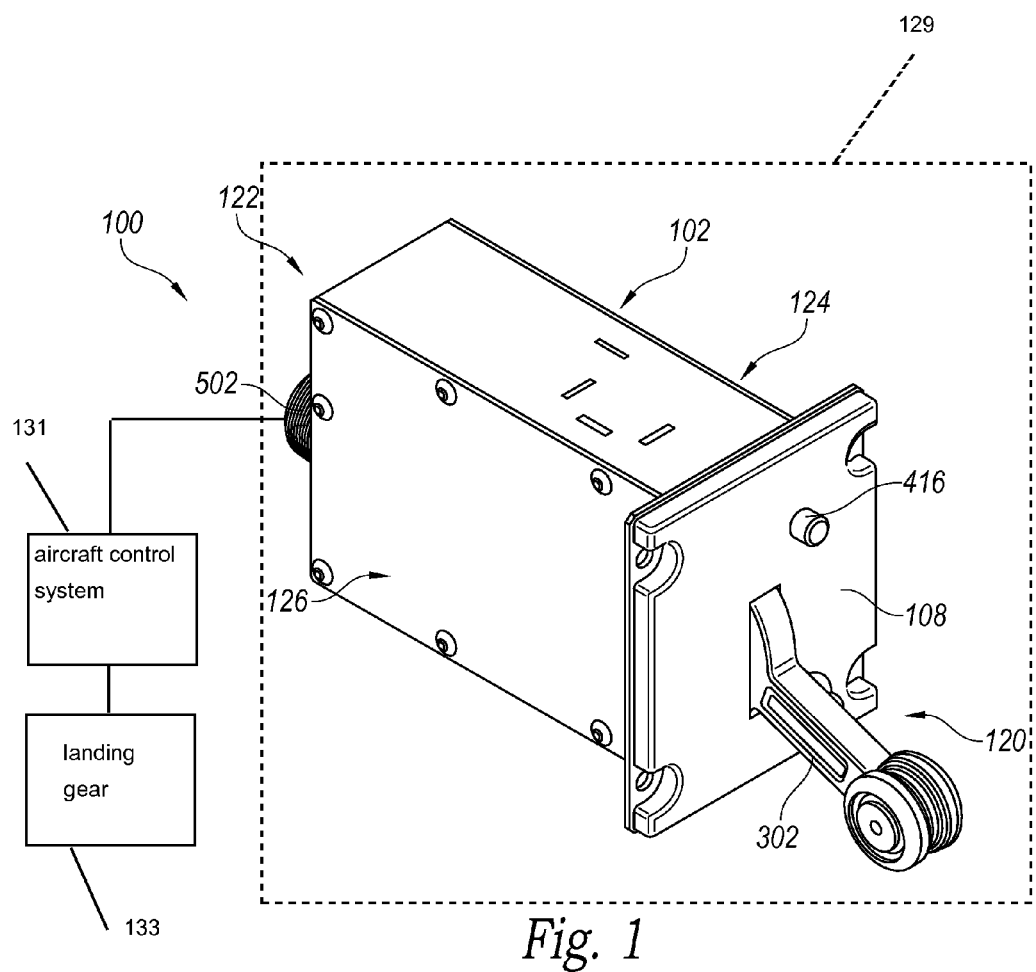
FIG. 1 is a front isometric view of an LGC system in accordance with one or more embodiments of the present technology, wherein the lever assembly is shown in a "down" position.

A landing gear control ("LGC") system 100 in accordance with embodiments of the present disclosure is shown in the drawings for purposes of illustration. In the following description, numerous specific details are discussed to provide a thorough and enabling description for embodiments of the disclosure. One skilled in the relevant art, however, will recognize that the disclosure can be practiced without one or more of the specific details. In other instances, well-known structures or operations are not shown, or are not described in detail, to avoid obscuring aspects of the disclosure. In general, alternatives and alternate embodiments described herein are substantially similar to the previously described embodiments, and common elements are identified by the same reference numbers.

Figure 2:
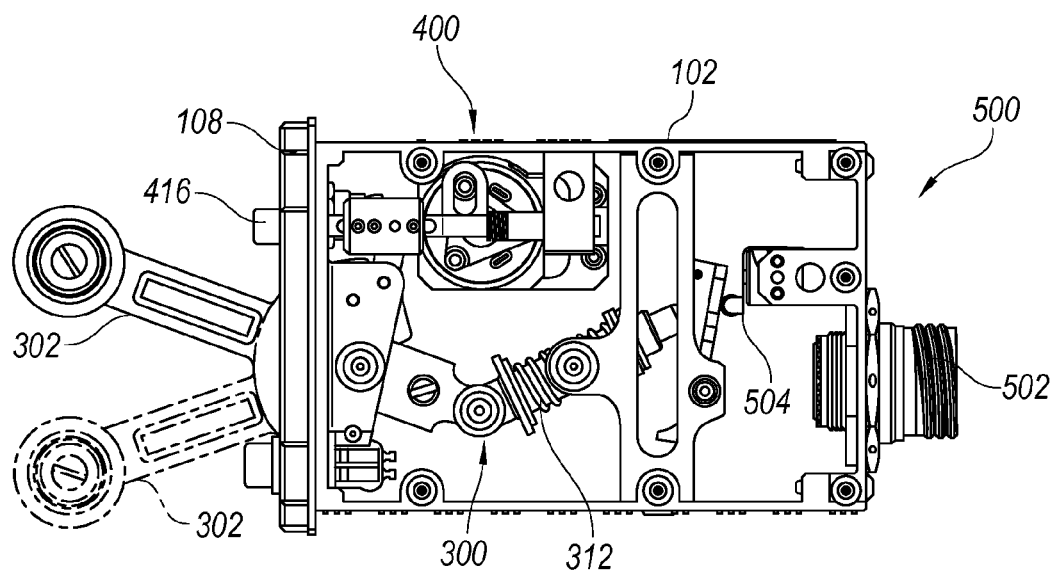
FIG. 2 is a partial left side elevation view of the LGC system of FIG. 1 with portions of the chassis removed for purposes of illustration, wherein the lever assembly is shown in the "down" position in phantom lines.

FIG. 1 is a front isometric view of a LGC system 100 in accordance with one or more embodiments of the present disclosure. FIG. 2 is a partial right side elevation view of the LGC system of FIG. 1 with portions of the LGC system 100 removed for purposes of illustration. Referring to FIGS. 1 and 2 together, the illustrated LGC system 100 has a front portion 120, a rear portion 122, a right portion 124, and a left portion 126. The LGC system 100 includes a chassis 102 configured to be positioned within the cockpit 129 of an aircraft (shown schematically in broken lines in FIG. 1). A front end of the chassis 102 is coupled to an illuminated face plate 108 that identifies one or more technical and/or functional aspects of the LGC system 100.

As best shown in FIG. 2, the LGC system 100 includes a switch assembly 500, a lever assembly 300, and a locking assembly 400, all of which are carried by the chassis 102 and are interdependent of operation of the aircraft landing gear 133. The switch assembly 500 has a multi-pin connector 502 securely mounted to the chassis 102. The connector 502 is configured to operatively provide an electrical and/or data connection between the LGC system 100 and the aircraft's main control system 131 for operation of the aircraft's landing gear 133. The switch assembly 500 includes a plurality of switches 504 (discussed in greater detail below) connected to the lever assembly 300. The lever assembly 300 has a switch actuator 312 that activates the switches 504 in response to an operator, such as a pilot, moving a control lever 302 of the lever assembly 300 between an "up" position and a "down" position (shown in phantom lines). The control lever's up position corresponds to the aircraft's landing gear 133 being in the retracted and stowed position. The control lever's down position corresponds to the aircraft's landing gear 133 being in the extended, deployed position. Accordingly, movement of the lever assembly 300 activates and de-activates the switch assembly 500 to retract and deploy the landing gear 133. The lever assembly 300 is connected to the locking assembly 400 which is configured to lock the lever assembly 300 in the down position and to release the lever assembly 300 for movement to the up position. The locking assembly 400 can release the lever assembly 300 automatically in response to signals from an aircraft control system 131 via the switch assembly 500 or manually in response to the pilot activating a manual override button 416 extending through an aperture in the face plate 108 generally adjacent to the control lever 302.

Retraction and Deployment of the Landing Gear

Figure 3A:
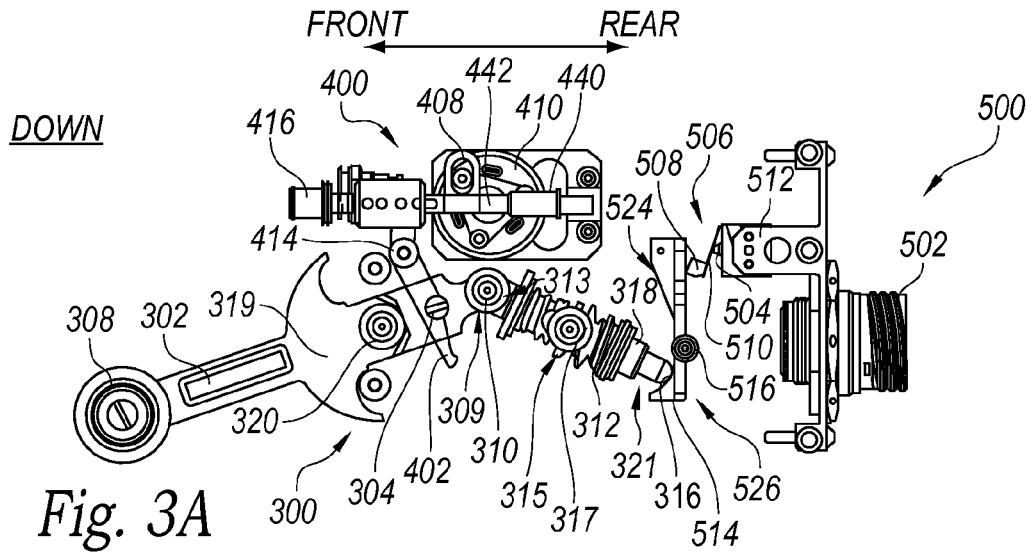
FIG. 3A is a partial right side elevation view of the LGC system of FIG. 1 showing the lever assembly in the "up" position, wherein the chassis is removed for purposes of illustration.
Figure 3B:
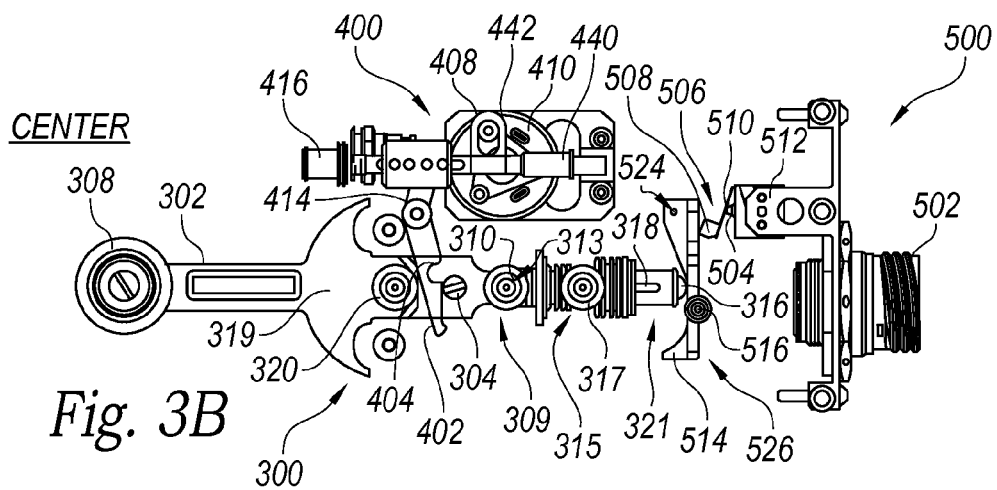
FIG. 3B is a partial right side elevation view of the LGC system of FIG. 1 showing the lever assembly in an "intermediate" position, wherein the chassis is removed for purposes of illustration.
Figure 3C:
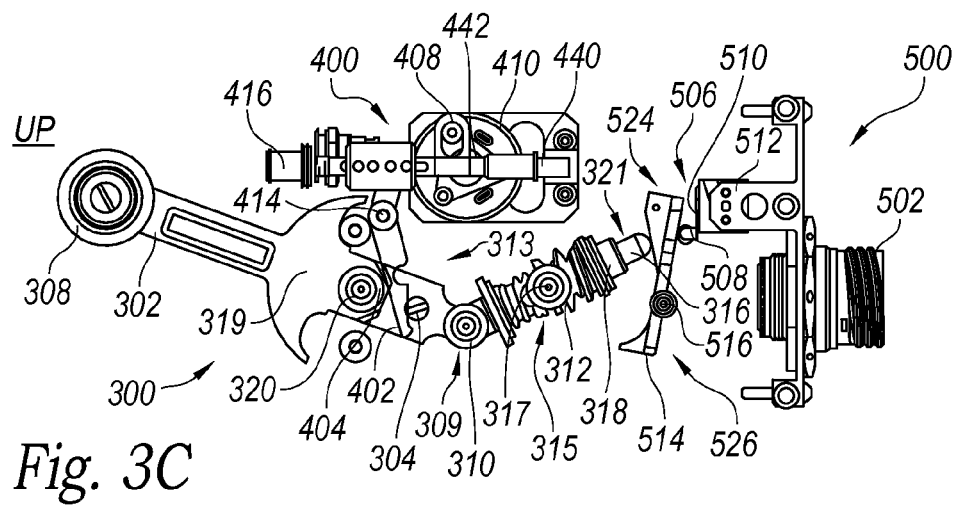
FIG. 3C is a partial right side elevation view of the LGC system of FIG. 1 showing the lever assembly in the "down" position, wherein the chassis is removed for purposes of illustration.

FIGS. 3A-3C are right side elevation views showing interaction between the lever assembly 300, the locking assembly 400, and the switch assembly 500 to control retraction and/or deployment of the landing gear 133. As shown in FIG. 3A, when the control lever 302 is in the down position, the lever assembly 300 is positioned so that the switches 504 of the switch assembly 500 are not activated (e.g., a switch mechanism 506 of the switch assembly 500 is open) and the landing gear 133 is deployed and so as to support the aircraft. To prevent premature or inadvertent movement of the control lever 302 away from the down position and retraction of the landing gear 133, the locking assembly 400 has a locking arm 402 that releasably locks the control lever 302 in the down position (e.g., when the locking arm is in the "locked" position). The locking arm 402 has a groove portion 404 that receives a locking element 304 projecting from the control lever 302 when the control lever is in the down position and the locking arm 402 is in a locked position. Accordingly, when the locking element 304 is in the groove portion 404, the locking arm 402 blocks the locking element 304 from moving along a range of motion, thereby locking the control lever 302 in the down position and preventing movement toward the up position. When the locking arm 402 is pivoted away from its locked position to an unlocked position, the locking element 304 is exterior of the groove (defined by a groove portion 404) such that the control lever 302 can move away from the down position without interference by the locking arm 402. When the control lever 302 is in the down position, the locking assembly 400 can be activated to move the locking arm 402 to the "unlocked" position by the aircraft control system 131 and/or the manual override button 416, thereby releasing the locking element 304 and allowing the control lever 302 to move to the up position to cause retraction of the landing gear 133.

Lever Assembly

The lever assembly 300 and its components will now be discussed in greater detail. As best seen in FIGS. 2 and 3A, the control lever 302 has a handle portion 308 on one end that projects from the chassis 102 (FIG. 2) and is configured to be grasped by an operator. Opposite the handle portion 308 along the lever assembly 300 is a link portion 309 disposed within the chassis 102 (FIG. 2). The control lever 302 is pivotally attached to a portion of the chassis 102 by a pivot pin 320 disposed at an intermediate portion 319 of the control lever 302 between the handle portion 308 and the link portion 309. Both the handle portion 308 and the link portion 309 pivot about the pivot pin 320 as the control lever 302 moves between the down and up positions. When the control lever 302 is in the down position, the handle portion 308 points downwardly (from the perspective and orientation shown in FIGS. 2 and 3A), and the link portion 309 points upwardly. As the control lever 302 pivots about the pivot pin 320 toward the up position, the handle portion 308 moves along an arcuate path until reaching the up position, wherein the handle portion 308 points upwardly. The link portion 309 also moves along an arcuate path and points downwardly when the control lever 302 is in the up position. The locking element 304 discussed above is attached to the control lever 302 between the pivot pin 320 and the link portion 309 within the chassis 102. The locking element 304 can be a stop pin or other suitable detent devices and/or components. As the control lever 302 pivots between the up and down position, the locking element 304 also travels along an arcuate path parallel to the path of the link portion 309.

The link portion 309 of the control lever 302 is pivotally connected to a link portion 313 of a switch actuator 312 at a lever assembly pivot point 310. The switch actuator 312 is pivotally connected at an intermediate portion 315 to the chassis 102 by a pivot pin 317. The switch actuator 312 also has an actuation portion 321 opposite the link portion 313 such that the pivot pin 317 is positioned along the length of the switch actuator 412 between the two portions 313 and 321. Accordingly, when the control lever 302 is in the down position, the switch actuator's link portion 313 (connected to the control lever's link portion 309 at the lever assembly pivot point 310) points upwardly and the actuation portion 321 points downwardly. As the control lever 302 pivots to the up position (FIG. 3C), the switch actuator 312 also pivots so that the switch actuator's link portion 313 points downwardly and the actuation portion 321 points upwardly. The arcuate motion of the switch actuator's actuation portion 321 is used to activate and deactivate the switch mechanism 506 of the switch assembly 500. In the illustrated embodiment, the actuation portion 321 includes a spring-loaded plunger 316 that slideably engages a cam plate 514 of the switch assembly 500 (described in greater detail below).

As the spring-loaded plunger 316 slides along the cam plate 514, the cam plate 514 exerts a forward force on the plunger 316 and causes the plunger 316 to extend from and retract into a hollow, tubular housing 318 of the switch actuator 312. As the control lever 302 moves from the down or up position to a "center" position (i.e., when pivot points 320, 310 and 317 are aligned, as shown in FIG. 3B), the plunger 316 incrementally compresses as it slides along the cam plate 514. Accordingly, the spring-loaded plunger 316 resists up-to-center or down-to-center motions of the control lever 302. Such resistance to motion helps maintain the lever assembly 300 in the down position (whether locked or unlocked) under the shock and vibrations experienced by an aircraft.

Switch Assembly

As discussed above, the switch assembly 500 includes a cam plate 514 pivotally attached to a portion of the chassis 102 by a pivot pin 516 located at an off-center position along the length of the cam plate 514. The pivot pin 516 generally divides the cam plate 514 into an upper section 524 and a lower section 526. The switch assembly 500 also includes a switch mechanism 506 that has a first portion 508 that engages and exerts a forward force on a rear surface of the upper section 524 of the cam plate 514, a third portion 510 fixed to the chassis 102 and/or the switches 504, and a second portion 512 disposed between the first and third portions 508, 510 and configured to engage the switches 504. Generally, the first and second portions 508, 512 are biased away from the switches 504. When the control lever 302 is in the down position, the switch actuator 312 points downwardly and the plunger 316 engages the lower section 526 of the cam plate 514 (FIG. 3A). As a result, the cam plate 514 is in a "neutral" position (FIGS. 3A and 3B) because of the rearward force(s) exerted by the plunger 316 at the lower section 526 of the cam plate 514 and the countering forward force(s) exerted by the switch mechanism 506 on the upper section 524 of the cam plate 514. Accordingly, when the control lever 302 is in the down position, the switch mechanism 506 is in an "open" position and the second portion 512 has not activated the switches 504. It should be noted that when the switch mechanism 506 is open, the second portion of the switch mechanism 506 may still be in contact with the switches 504, but not providing enough rearward force on the switches 504 to activate them.

As the control lever 302 moves upwardly from the down position toward a center position (FIG. 3B), the plunger 316 slides upwardly along a front surface of the cam plate 514 from the lower section 526 towards the upper section 524. When the control lever 302 is in the center position, the plunger 316 is fully compressed and exerting a rearward force on the cam plate 514 at a point along the length of the cam plate 514 above the cam plate pivot pin 516. In this configuration, the upper section 524 of the cam plate 514 does not tilt to the point of closing the switches 504 since the switch mechanism 506 exerts a countering forward force on the rear surface of the upper section 524 of the cam plate 514. However, once the lever assembly 300 is rotated upwardly to a point just past the center position (e.g., to an "over-center" position), the plunger 316 extends from the housing 318 and forces the upper section 524 of the cam plate 514 to tilt rearward about the pivot pin 516. When the cam plate 514 is in a "tilted" position (FIG. 3C), the second portion 512 of the switch mechanism 506 is forced rearwardly and activates the switches 504 (the switch mechanism is in a "closed" position), thereby signaling to the aircraft control system 131 (e.g., via the connector 502) to retract the landing gear 133.

Locking Assembly

Figure 4A:
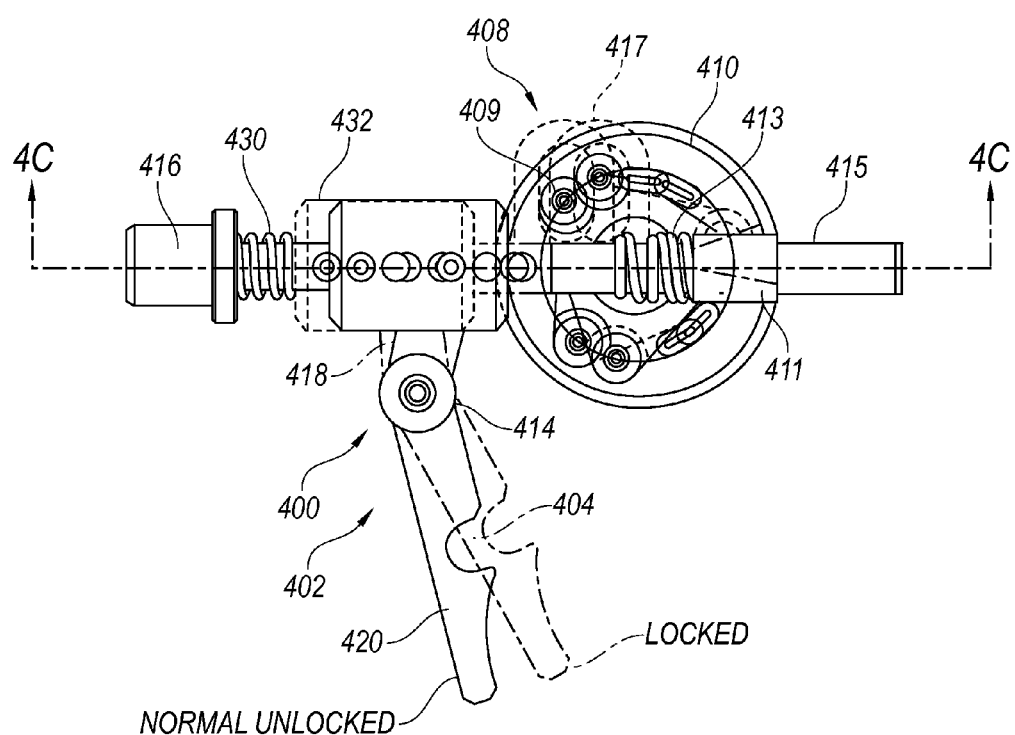
FIG. 4A is a schematic partial right side view of a locking assembly of the LGC system of FIG. 1 showing the locking assembly in solid lines in the "locked" position and in phantom lines in the "unlocked" position.
Figure 4B:
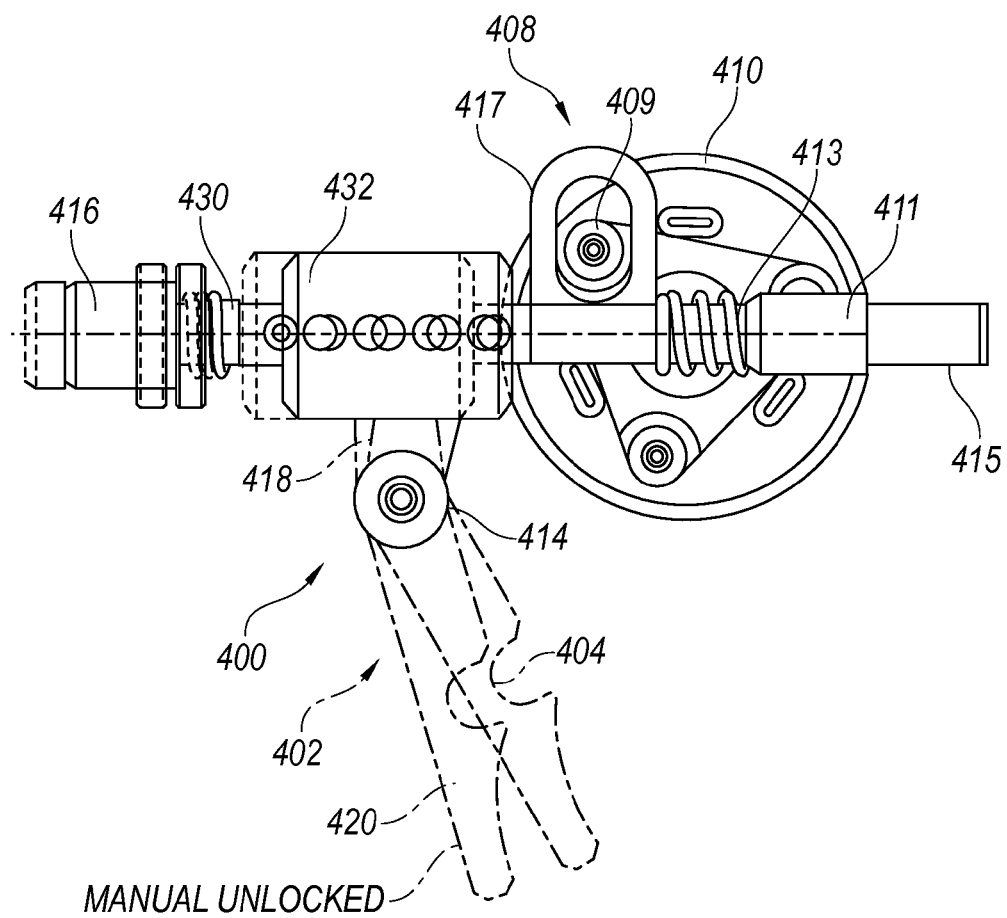
FIG. 4B is a schematic partial right side view of the locking assembly of FIG. 4A in the "locked" and "manual override unlocked" positions.

FIG. 4A is a partially schematic left side view of the locking assembly 400 of FIG. 1 showing the locking assembly 400 in the "locked" position and "normal unlocked" position (shown in phantom lines), and FIG. 4B is a partially schematic side view of the locking assembly 400 of FIG. 1 showing the locking assembly 400 in the "locked" position and "manual override unlocked" position (shown in phantom lines). In the locked position, a portion of the locking arm 402 (discussed above) is in a rearward position that securely engages the locking element 304 extending from the control lever 302 and prevents the control lever 302 from upward movement. In the unlocked position (normal or manual override), a portion of the locking arm 402 is in a forward position that allows upward movement of the control lever 302. As described in further detail below, forward movement of a locking portion 420 of the locking arm 402 can be achieved either automatically by activation of a rotary actuator 410 of the locking assembly 400 (FIG. 4A), or manually by forward movement of the manual override button 416 (FIG. 4B).

The locking assembly 400 has a clevis 432 connected to the locking arm 402, a Scotch yoke member 408 connected to the clevis 432, and a rotary actuator 410 connected to the Scotch yoke member. The locking portion 420 of the locking arm 402 (discussed above) is configured to engage the locking element 304 extending from the control lever 302. In the illustrated embodiment, the locking portion 420 has a groove portion 404 that receives the locking element 304. The locking arm 402 also has a link portion 418 that connects to the clevis 432. The locking arm 402 is pivotally attached to a portion of the chassis 102 by a locking arm pivot pin 414 disposed between the locking portion 420 and the link portion 418. When the link portion 418 moves forwardly, the locking portion 420 pivots rearwardly around the pivot pin 414 into a locked position. When the link portion 418 moves rearwardly, the locking portion pivots forwardly around the pivot pin 414 into an unlocked position.

Figure 4C:
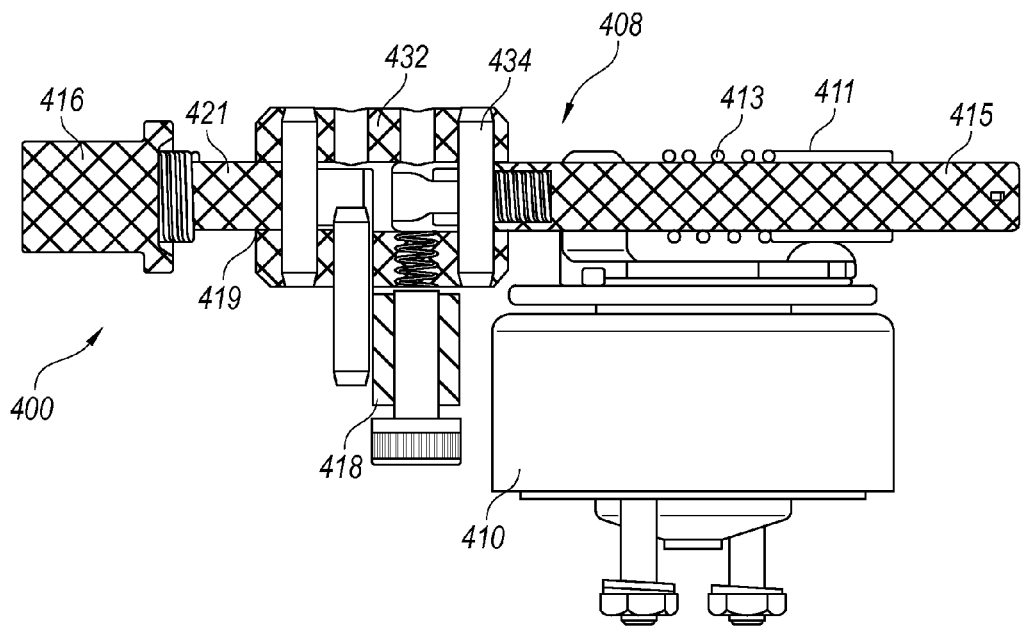
FIG. 4C is a partial cross-sectional elevation view taken along the line 4C-4C in FIG. 4A.

FIG. 4C is a partial cross-sectional view of the locking assembly of FIG. 4A. Referring to FIGS. 4A and 4C together, the clevis 432 of the locking assembly 400 has a channel 419 extending through a central portion of the clevis 432 from a front end of the clevis to a rear end of the clevis 432. The clevis 432 may also have one or more lateral channels 434 running transverse to the central channel 419. In the illustrated embodiment, the clevis 432 is a hollow cylinder, but in other embodiments the clevis 432 may be any shape. The clevis 432 provides the mechanical connection between the locking arm 402 and the Scotch Yoke member 408. Accordingly, forward/rearward motion of the Scotch Yoke member 408 causes forward/rearward motion of the clevis 432, and forward/rearward motion of the clevis 432 results in forward/rearward motion of the link portion 418 of the locking arm 402.

The Scotch yoke member 408 has a shaft 415 and a slot 417 extending laterally from the shaft 415. A forward end of the shaft 415 is slideably positioned within the central channel 419 of the clevis 432. Additionally, a rear portion of the shaft 415 is slidably positioned within a sleeve bearing 411 fixed to the chassis 102, and the Scotch yoke member 408 further includes a spring 413 positioned around the shaft between the slot 417 and the sleeve bearing 411. The spring 413 provides a forward force on the slot 417 and biases the Scotch yoke member 408 towards a forward position (and the locking arm 402 in a locked position).

The slot 417 of the Scotch yoke member 408 engages a drive pin 409 coupled to a left face of the rotary actuator 410. The Scotch yoke member 408 converts the rotational motion of the rotary actuator 410 to linear motion of the Scotch yoke member 408. The rotary actuator 410 is fixed to the chassis 102 (FIG. 2) and configured to communicate with a vehicle control system, such as the aircraft control system 131. The rotary actuator 410 rotates about its central axis in response to activation (or de-activation) by the aircraft control system 131. In the illustrated embodiment, the rotary actuator 410 rotates clockwise (e.g., about 25°) when activated and causes forward motion of the Scotch yoke member's shaft 415. When the rotary actuator is de-activated, the rotary actuator 410 rotates counterclockwise (e.g., about 25°) and causes rearward motion of the shaft 415.

To move from the locked position to the unlocked position, for example, at a time after the aircraft takes off when the landing gear 133 is no longer supporting the weight of the aircraft, the aircraft control system 131 activates the rotary actuator 410, which causes the rotary actuator 410 to rotate, causing forward motion of the shaft 415, thereby pulling the link portion 418 of the locking arm 402 rearward and moving the locking portion 420 of the locking arm 402 in an forward direction. As the locking portion 420 of the locking arm 402 moves forwardly, the locking element 304 of the control lever 302 slides along a portion of the locking arm 402 and is released. Once the control lever 302 is unlocked, the control lever 302 can be raised to activate the switches 504 and signal to the aircraft to retract the landing gear 133.

Figure 4D:
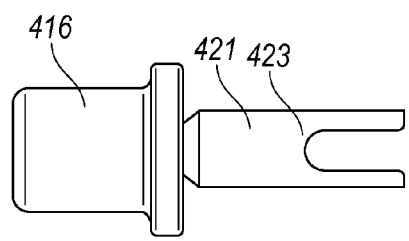
FIG. 4D is an isolated right side elevation view of a manual override button of the locking assembly of FIG. 4A shown removed from the assembly for purposes of clarification.

In contrast to the normal unlocking mechanism shown in FIG. 4A, should the rotary actuator 410 be unable to rotate out of the locked position (e.g., a jammed solenoid), FIG. 4B illustrates a manual override unlocking mechanism whereby actuation of a manual override button 416 manually releases the locking arm 402 from the control lever 302. The manual override button 416 of the illustrated embodiment includes a shaft 421 slidably positioned within the central channel 419 of the clevis 432. The manual override button 416 can be biased away from a forward exterior portion of the clevis 432 by a spring 430 so that accidental or slight rearward movements of the button 416 do not cause movement of the clevis 432. Additionally, FIG. 4D shows that in some embodiments the button 416 can include a recess 423 in the shaft 421 such that rearward motion of the button 416 will not cause rearward motion of the clevis 432 (and unlock the control lever 302) until a portion of the recess 423 contacts an interior portion of the clevis 432.

As shown in FIG. 4B, pushing the manual override button 416 in a rearward direction can move the clevis 432 rearwardly. Since the Scotch yoke member 408 is slidably positioned within the clevis 432, the clevis 432 can move independently of the rotary actuator 410 and/or Scotch yoke member 408. Accordingly, rearward motion of the clevis 432 resulting from rearward motion of the button 416 rearwardly moves the link portion 418 of the locking arm 402 without causing rotation of the rotary actuator 410. As a result, the locking arm 402 rotates about the locking arm pivot pin 414, without rotation of the rotary actuator 410, thereby disengaging from the locking element 304, moving the locking portion 420 of the locking arm 402 forwardly, and unlocking the control lever 302 to allow movement away from the down position.

As disclosed herein, the rotary actuator 410 and Scotch yoke member 408 combination provides increased performance over conventionally used linear solenoids by providing a consistent force while using less space, weight and power to move the locking arm 402. For example, because a rotary actuator has a significantly smaller air gap between the actuator core and the armature, the combination of the Scotch yoke member 408 and the rotary actuator 410 produces more force. In addition, rotary actuators 410 are smaller and uses power more efficiently, which results in generating much less heat. Accordingly, the rotary actuator 410 increases performance because it has a 100% duty cycle without excessive heat and power dissipation.

Figure 5A:
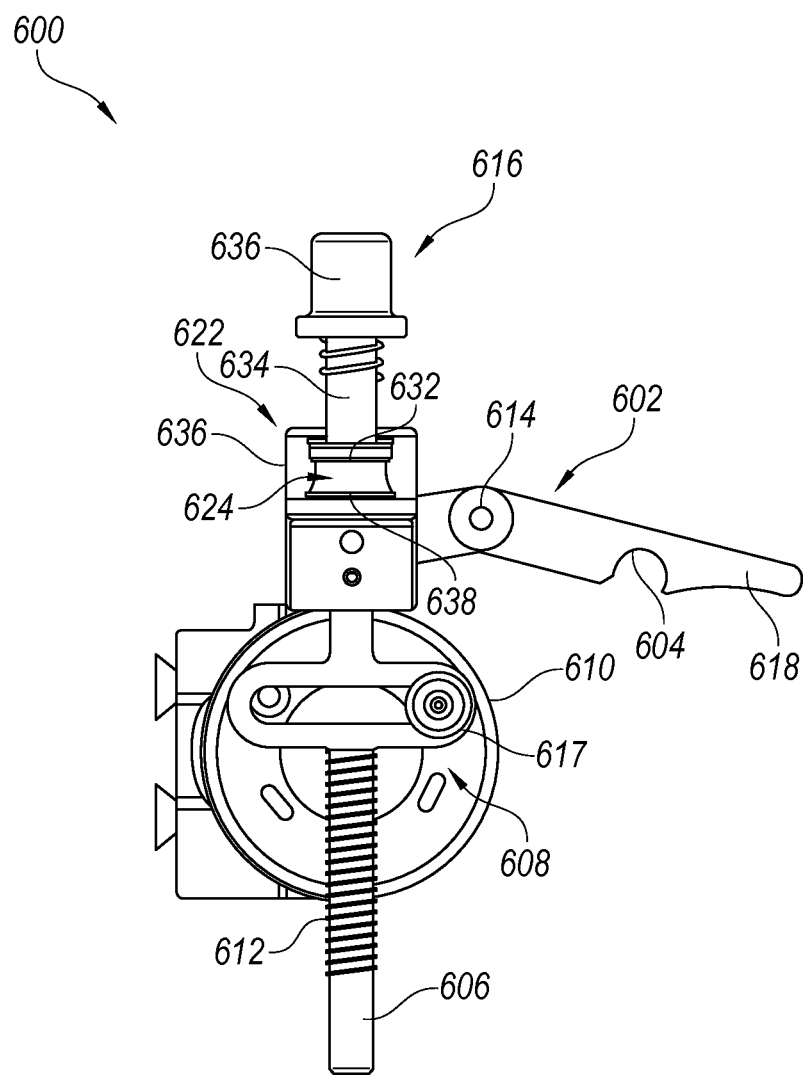
FIG. 5A is a left side elevation view of a locking assembly configured in accordance with the one or more embodiments of the present technology.
Figure 5B:
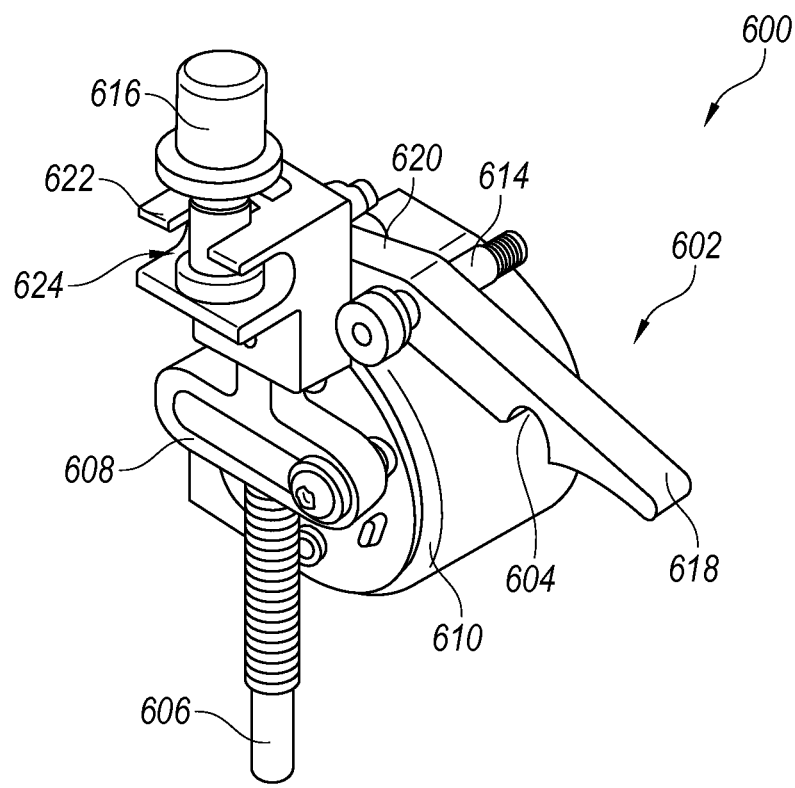
FIG. 5B is a left isometric view of the locking assembly of FIG. 5A.
Figure 5C:
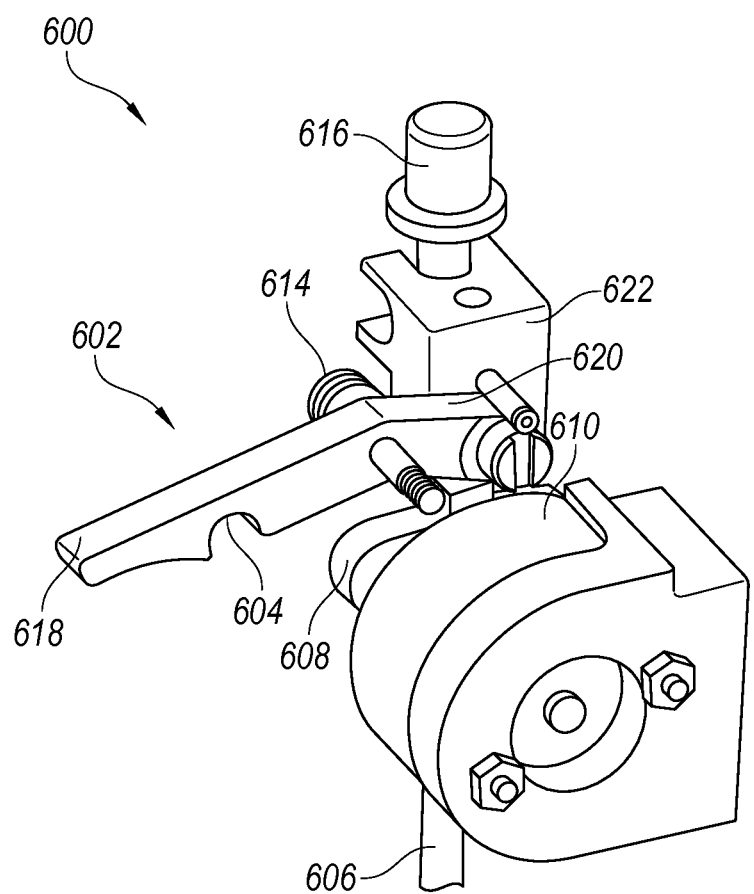
FIG. 5C is a right isometric view of the locking assembly of FIG. 5A.

FIG. 5A is a front elevation view of a locking assembly 600 configured in accordance with another embodiment of the present technology. FIGS. 5B and 5C are right and left isometric views of the locking assembly of FIG. 5A, respectively. Referring to FIGS. 5A-5C together, the normal locking mechanism of the locking assembly 600 is similar to that described above with reference to FIGS. 3A-4D. However, FIG. 5A shows a Scotch yoke member 608 having a bilateral slot 617. The bilateral slot 617 allows full rotation of the rotary actuator 610 while engaging the Scotch yoke member 608. Additionally, the drive pin 609 coupled to the rotary actuator 610 can engage the slot 617 on one or both sides of the slot 617. This configuration enables the locking assembly 400 to be installed within the LGC system 100 on the right or left side of the chassis 102.

The manual override locking mechanism of the locking assembly 600 is similar to that described above with reference to FIGS. 3A-4B. As best shown in FIG. 5A, the manual override button 616 includes a button top 636 at a forward portion, a lip 632 at a rear portion, and a shaft 634 in between. The button top 636 is slideably positioned atop the shaft 634 and is biased forwardly by a spring 630 surrounding at least a portion of the shaft 634. As a result, the button top 636 can be at least partially depressed without moving the shaft 634. The lip 632 at the rear end of the shaft 634 sits within a gated opening 624 within a locking housing 622. As best seen in FIG. 5A, the opening 624 can have one or more sidewalls shaped to provide an initial resistance to rearward motion of the shaft 634. Accordingly, both the spring 630 and the gated opening 624 ensure that the manual override mechanism is not activated prematurely.

When the button top 636 is depressed with enough force, the lip portion 632 can push past a narrow portion between the sidewalls and engage a floor 638 of the locking housing 622. The forward motion of the floor 638 of the locking housing 622 results in rearward motion of a locking portion 618 of the locking arm 602, thereby rotating the locking arm 602 about a chassis attachment point 614 and raising a locking portion 620 of the locking arm 602. The locking housing 622 is slideably positioned atop a front end of the Scotch yoke member 608 such that rearward motion of the locking housing 622 does not cause rearward motion of the Scotch yoke member 608 or rotation of the rotary actuator 610.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

We claim:

1. A landing gear control system for use in an aircraft having landing gear, comprising:
    a lever assembly comprising—
        a control lever pivotable between a first position and a second position about a pivot point; and
        a locking element coupled to the control lever;
    a switch assembly operably connected to the lever assembly, wherein the switch assembly has at least one switch and is configured to control movement of the landing gear of the aircraft, wherein the switch is activated in response to movement of the control lever between the first and second positions;
    a locking assembly operably connected to the lever assembly, the locking assembly comprising—
        a rotary actuator;
        a Scotch yoke member with a shaft and a slot extending laterally from the shaft and operably connected to a portion of the rotary actuator such that rotation of the rotary actuator causes linear movement of the Scotch yoke member;
        a locking arm operably coupled to the Scotch yoke member and moveable between locked and unlocked positions upon rotation of the rotary actuator, wherein—
            the locking arm in the locked position engages the locking element of the lever assembly when the control lever is in the first position and prevents the control lever from moving to the second position, and
            the locking arm in the unlocked position allows the control lever to move away from the first position.

2. The system of claim 1, further comprising a manual override member coupled to the locking arm and manually actuatable to move the locking arm from the locked position to the unlocked position independent of rotation of the rotary actuator to allow manual movement of the control lever between the first and second positions.

3. The system of claim 1 wherein the rotary actuator comprises a rotary solenoid.

4. The system of claim 1, further comprising a switch actuator pivotally connected to the control lever, wherein the switch actuator has an extendable portion that is configured to extend and retract upon rotation of the control lever.

5. The system of claim 4 wherein the switch actuator includes a hollow, tubular housing and the extendable portion is a spring-loaded plunger at least partially contained within the housing.

6. The system of claim 4, further comprising a cam plate mechanically coupled to the switch actuator, wherein the extendable portion of the switch actuator slides along a surface of the cam plate during movement of the control lever; between the first and second positions.

7. The system of claim 1 wherein:
    the locking assembly further includes a drive pin coupled to the rotary actuator;
    the Scotch yoke member further includes a shaft coupled to the locking arm and a slot portion extending laterally from the shaft; and
    wherein the slot portion of the Scotch yoke member slidably engages the drive pin.

8. The system of claim 1, further comprising a chassis, wherein the lever assembly, the switch assembly, and the locking assembly are mounted to the chassis.

9. The system of claim 1 wherein the locking assembly further includes a clevis operably coupled to the Scotch yoke member, and the locking arm.

10. The system of claim 1 wherein the locking arm includes a groove portion that contains the locking element of the lever assembly when the locking arm is in the locked position.

11. A landing gear control system coupleable to landing gear of a vehicle, comprising:
    a lever assembly having a landing gear control lever and a locking element connected to the landing gear control lever;
    a locking assembly coupled to the landing gear control lever, the locking assembly comprising:
        a rotary actuator with a drive member;
        a manual override button;
        a Scotch yoke member with a shaft and a slot extending laterally from the shaft and slideably connected to the drive member of the rotary actuator such that rotation of the rotary actuator causes linear movement of the Scotch yoke member;
        a locking arm operably coupled to the Scotch yoke member and moveable between locked and unlocked positions upon rotation of the rotary actuator; and
        a clevis operably coupled to the Scotch yoke member, the manual override button, and the locking arm; and
    wherein—
        the locking arm in the locked position engages the locking element of the lever assembly when the control lever is in the first position and prevents the control lever from moving to the second position, and
        the locking arm in the unlocked position is disengaged from the locking element and allows the control lever to move away from the first position.

12. The locking assembly of claim 11, further comprising a manual override button coupled to the locking arm such that depression of the override button causes the locking arm to rotate and disengage the locking element of the lever assembly.

13. The locking assembly of claim 11 wherein the rotary actuator comprises a rotary solenoid.

14. The locking assembly of claim 11 wherein the locking arm includes a groove configured to engage the locking element of the lever assembly.

15. The locking assembly of claim 11 wherein the slot includes:
- a first portion that extends laterally to a first side of the shaft; and
- a second portion that extends laterally to a second side of the shaft that is opposite the first side.

16. A landing gear control system for use in an aircraft having a cockpit and landing gear, comprising:
- a chassis configured to be positioned within the cockpit of the aircraft, the chassis having an external portion and an internal portion;
- a lever assembly including—
  - a control lever extending through a portion of the chassis and pivotable between a first control position and a second control position about a control lever pivot point attached to the internal portion of the chassis;
  - a locking element coupled to the control lever and movable with the control lever between the first and second control positions;
- a switch assembly coupled to the chassis and operably connected to the lever assembly, the switch assembly having at least one switch and an electrical or optical connector coupled to the switch and extending through a portion of the chassis, wherein the switch controls movement of the landing gear of the aircraft, wherein the switch is activated in response to movement of the control lever between the first and second positions;
- a locking assembly operably coupled to the chassis and operably connected to the lever assembly, the locking assembly including—
  - a rotary actuator;
  - a Scotch yoke member operably connected to a portion of the rotary actuator such that rotation of the rotary actuator causes linear movement of the Scotch yoke member;
  - a locking arm pivotable between a first locking position and a second locking position about a locking arm pivot point attached to the internal portion of the chassis, wherein the locking arm is operably coupled to the Scotch yoke member and moveable between locked and unlocked positions upon rotation of the rotary actuator, and wherein—
    - the locking arm in the locked position engages the locking element of the lever assembly when the control lever is in the first position and prevents the control lever from moving to the second position, and
    - the locking arm in the unlocked position allows the control lever to move away from the first position.

17. A method of manufacturing a landing gear control system for use with landing gear of an aircraft, the method comprising:
- pivotally attaching a lever assembly to a chassis the lever assembly having a control lever pivotable between a first position and a second position about a pivot point, and a locking element coupled to the control lever and movable with the control lever between the first and second control positions;
- connecting the lever assembly to the chassis and coupling the lever assembly to a switch assembly, the switch assembly having at least one switch and being configured to control movement of the landing gear of an aircraft, wherein the switch is activated in response to movement of the control lever between the first and second positions; and
- connecting a locking assembly to the chassis, the locking assembly including:
  - a rotary actuator having a drive member;
  - a Scotch yoke member with a shaft and a slot extending laterally from the shaft and slideably connected to the drive member of the rotary actuator such that rotation of the rotary actuator causes linear movement of the Scotch yoke member;
  - a locking arm operably coupled to the Scotch yoke member and moveable between locked and unlocked positions upon rotation of the rotary actuator, wherein—
    - the locking arm in the locked position engages the locking element of the lever assembly when the control lever is in the first position and prevents the control lever from moving to the second position, and
  - the locking arm in the unlocked position allows the control lever to move away from the first position.

\* \* \* \* \*